(12) United States Patent
Bhattacharyya et al.

(10) Patent No.: US 9,893,881 B2
(45) Date of Patent: Feb. 13, 2018

(54) EFFICIENT SHARING OF HARDWARE ENCRYPTION PIPELINE FOR MULTIPLE SECURITY SOLUTIONS

(71) Applicant: Intel Corporation, Santa Clara, CA (US)

(72) Inventors: Binata Bhattacharyya, Portland, OR (US); Siddhartha Chhabra, Hillsboro, OR (US); Evgeny Zhyvov, Haifa (IL); Eugene M. Kishinevsky, Hillsboro, OR (US); Men Long, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 14/753,987

(22) Filed: Jun. 29, 2015

(65) Prior Publication Data
US 2017/0063532 A1 Mar. 2, 2017

(51) Int. Cl.
*H04L 9/06* (2006.01)
*G06F 21/72* (2013.01)
*G06F 21/76* (2013.01)

(52) U.S. Cl.
CPC ............ *H04L 9/0637* (2013.01); *G06F 21/72* (2013.01); *G06F 21/76* (2013.01); *H04L 9/0631* (2013.01); *H04L 2209/125* (2013.01)

(58) Field of Classification Search
CPC ..... H04L 9/0637; H04L 9/0631; G06F 21/72; G06F 21/76
See application file for complete search history.

(56) References Cited

U.S. PATENT DOCUMENTS 8,700,896 B1 * 4/2014 Sobel ................. H04L 63/0428
709/203
8,908,307 B1 * 12/2014 Yang ................... G11B 20/1833
360/39

(Continued)

OTHER PUBLICATIONS

Soliman et al., "Shared cryptography accelerator for multicores to maximize resource utilization", IEEE, Dec. 1, 2011, pp. 33-38, http://ieeexplore.ieee.org/stamp/stamp.jsp?arnumber=6141007&tag=1.*

(Continued)

*Primary Examiner* — Theodore C. Parsons
*Assistant Examiner* — Carlos M De Jesus Lassala
(74) *Attorney, Agent, or Firm* — Lowenstein Sandler LLP

(57) ABSTRACT

A processing or memory device may include a first encryption pipeline to encrypt and decrypt data with a first encryption mode and a second encryption pipeline to encrypt and decrypt data with a second encryption mode, wherein the first encryption pipeline and the second encryption pipeline share a single, shared pipeline for a majority of encryption and decryption operations performed by the first encryption pipeline and by the second encryption pipeline. A controller (and/or other logic) may direct selection of encrypted (or decrypted) data from the first and second encryption pipelines responsive to a region of memory to which a physical address of a memory request is directed. The result of the selection may result in bypassing encryption/decryption or encrypting/decrypting the data according to the first encryption mode or the second encryption mode. More than two encryption modes are envisioned.

23 Claims, 14 Drawing Sheets

(56) References Cited

U.S. PATENT DOCUMENTS

| | | | | |
|---|---|---|---|---|
| 2003/0061499 A1* | 3/2003 | Durrant | ............... | G06F 12/1408 |
| | | | | 713/189 |
| 2004/0250097 A1* | 12/2004 | Cheung | ................... | G06F 21/85 |
| | | | | 713/193 |
| 2006/0008079 A1* | 1/2006 | Daemen | .............. | G06F 12/1408 |
| | | | | 380/28 |
| 2009/0006796 A1* | 1/2009 | Chang | ................... | G06F 21/805 |
| | | | | 711/163 |

OTHER PUBLICATIONS

Silab, "AES Cipher Modes with EFM32" Sep. 16, 2013, pp. 1-20, https://www.silabs.com/documents/public/application-notes/AN0033.pdf.*

Kleidermacher, Dave, "Enhance system security with better data-at-rest encryption" Mar. 24, 2012, pp. 1-3 http://www.embedded.com/print/4369714.*

"Block Ciper Mode of Operation," defintion, wikipeida, http://en.wikipedia.org/wiki/Block_cipher_mode_of_operation, accessed May 8, 2015.

"Advanced Encryption Standard," definition, wikipedia, http://en.wikipedia.org/wiki/Advanced_Encryption_Standard, accessed May 8, 2015.

"Disk Encryption Theory," definition, wikipedia, http://en.wikipedia.org/wiki/Disk_encryption_theory, accessed May 8, 2015.

* cited by examiner

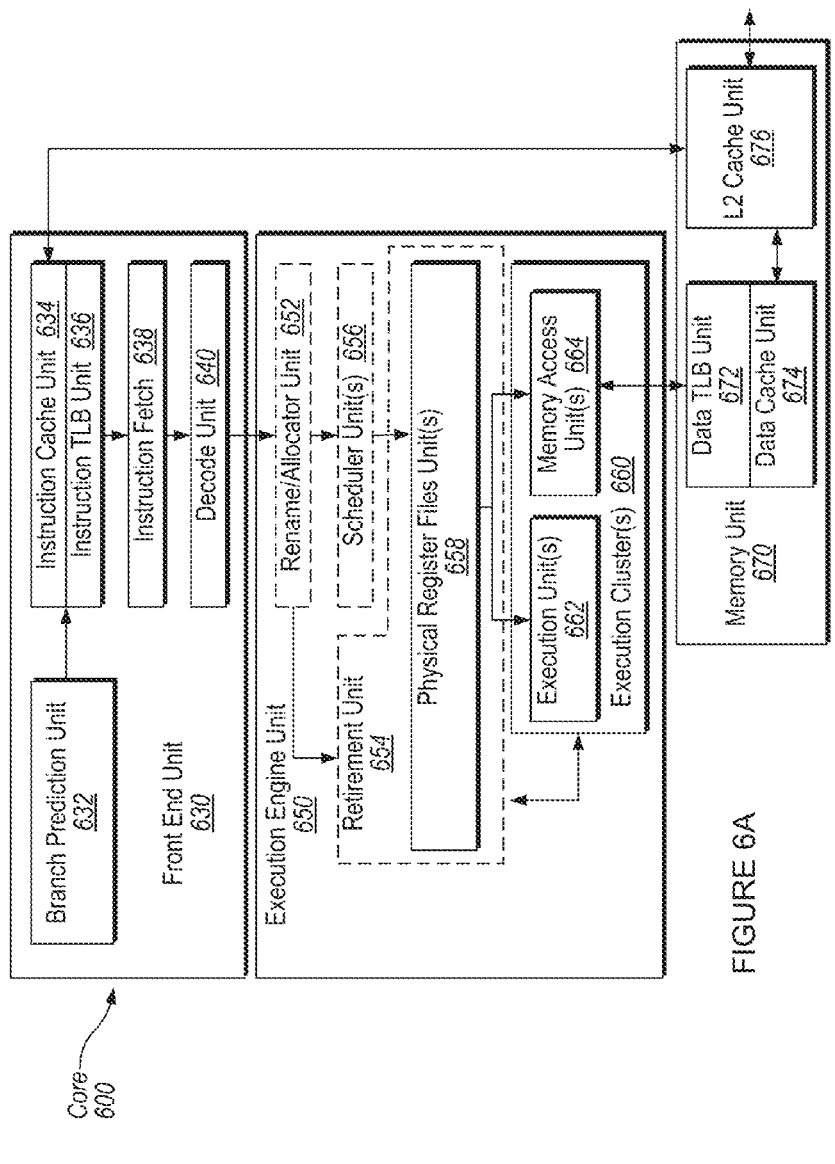

EFFICIENT SHARING OF HARDWARE ENCRYPTION PIPELINE FOR MULTIPLE SECURITY SOLUTIONS

The present disclosure relates to the field of hardware security solutions and encryption, and, in particular, to the efficient sharing of a hardware encryption pipeline for a range of hardware security solutions, to include multiple encryption modes.

BACKGROUND

Electronic data security has become an area of great focus for development as more daily transactions become computerized. Computing devices are constantly being utilized to exchange financial data, personal identification data, and the like. As a result, hackers may attempt to compromise computing devices to gain access to this valuable information. For example, malicious software (e.g., malware) may be loaded to passively or actively attack computing devices. Passive attacks may comprise malware observing data being passed between a processor and a memory to obtain passwords or other sensitive or confidential data. Active attacks may involve altering data stored in memory to trigger an atypical result such as allowing an unpermitted user to gain access to the computing device. In either instance, plaintext (unencrypted) data in the memory of a computing device that is exchanged with a processor in the computing device may present a major vulnerability.

Device manufacturers, component manufacturers, and software developers, for example, continue to try to develop protective measures to combat vulnerabilities. Software-based malware detection and elimination solutions typically operate at the privilege level of an operating system (OS) in the computing device. These solutions may be effective against lower privilege attacks, but may not be able to combat higher-privileged malware like rootkits. Some hardware-based protective solutions are now emerging that are instituted very early during boot-up of a computing device, and thus may establish protective measures before malware even becomes active. Known-good protection firmware may be loaded early on during boot-up that may perform various functions such as checking whether subsequently loaded software comports with known-good versions, establishing protected areas of memory wherein data may be protected from being accessed by hostile software, and the like. While the benefits of these protective measures may be apparent, at least one issue that hardware protection systems may introduce is additional processing overhead at a very low level resulting in, for example, slower overall performance for the computing device.

Furthermore, as the concern regarding data theft grows from cloud computing to physical attacks of personal devices or client systems, and to identity theft, the list of vulnerabilities keeps growing. And, as a result, the number of security solutions continues to grow to address vulnerabilities of different kinds and levels of risk. Each security solution carries different impacts on computing performance, memory overhead and bandwidth. It is difficult to foresee all of the market needs in terms of choice of the security solutions for different vendors or customers. It is also expensive to manufacture customized devices (or components for those devices) that each covers a different security solution in anticipation of various security level demands. And, to implement all the security solutions and corresponding encryption modes into the same devices would require too much space, much of which would be wasted for lower security level options, if chosen.

BRIEF DESCRIPTION OF THE DRAWINGS

FIG. 6A is a block diagram illustrating a micro-architecture for a processor such as a processing device and/or memory execution unit illustrated in FIG. 1 according to one embodiment.

FIG. 6B is a block diagram illustrating an in-order pipeline and a register renaming stage, out-of-order issue/execution pipeline according to one embodiment.

DESCRIPTION OF EMBODIMENTS

Figure 1:
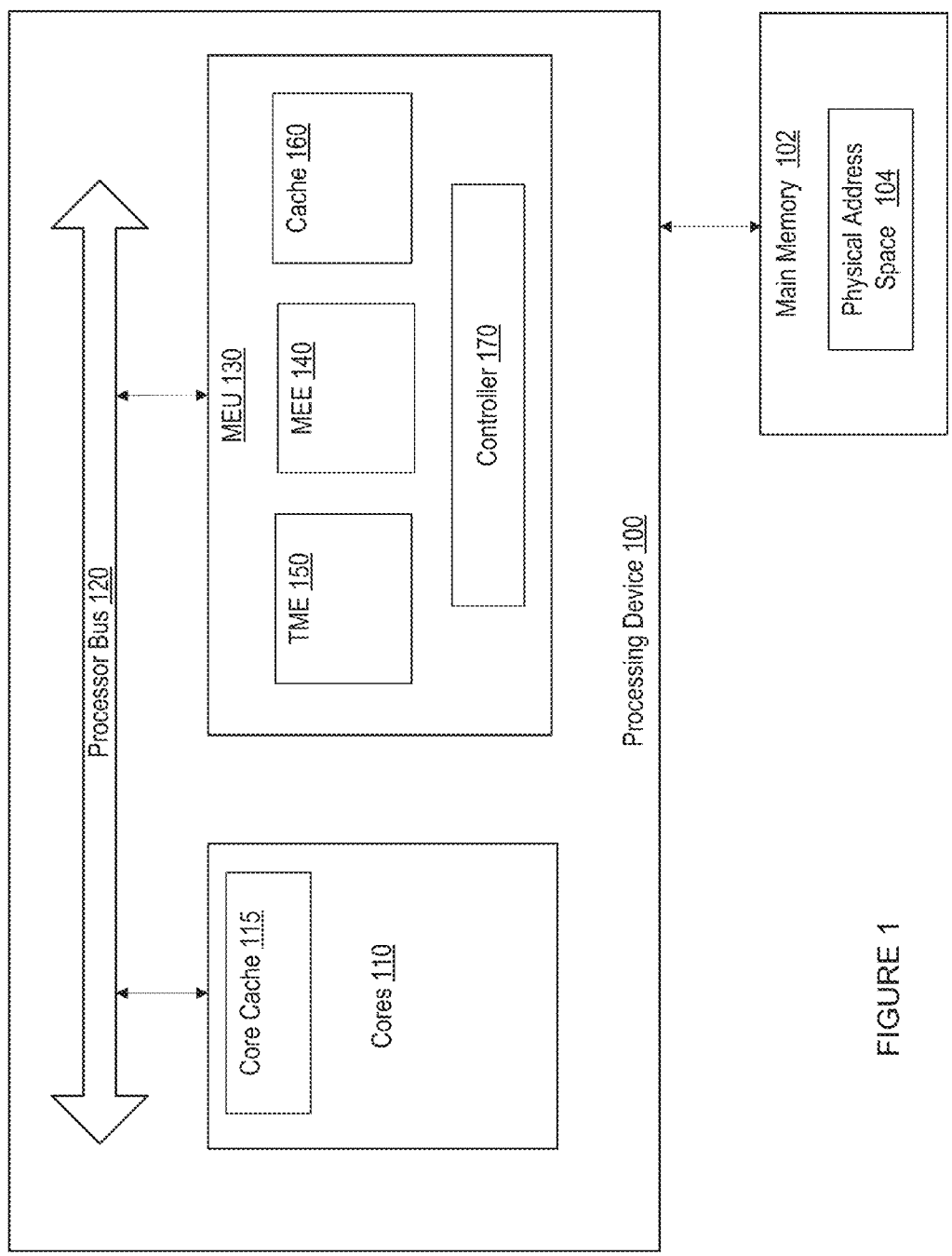
FIG. 1 is a block diagram of a processing device according to one embodiment.

Processing and memory devices are disclosed in which at least two different encryption/decryption pipelines (each to carry out encryption according to a different encryption mode) may share a portion of the same pipeline. This shared encryption/decryption pipeline may perform the same encrypting/decrypting function and significantly reduce on-die space required for a larger range of security solutions, e.g., those that may use one or both of the at least two different encryption pipelines. In sharing a large portion of the encryption pipelines for the different encryption modes, a large area on a die or chip is saved, and performance, memory overhead and bandwidth impacts are minimized.

In one embodiment, a hardware pipeline may include a first pre-computation block and a second pre-computation block that contain logic to begin encryption (or decryption) of data according to, respectively, a first encryption mode and a second encryption mode before being written to (or read from) memory. The hardware pipeline may include a shared encryption pipeline coupled to the first and second pre-computation blocks that performs a majority of a remainder of the encryption (or decryption) of the data regardless of encryption mode. The hardware pipeline may also include a first post-computation block and a second post-computation block coupled to the shared encryption pipeline that contains logic to complete encryption (or decryption) of the data according to, respectively, a corresponding one of the first encryption mode and the second encryption mode before the data is written to, or read from, the memory.

In another embodiment, a memory encryption unit (MEU) may include a memory encryption engine (MEE) to handle encryption/decryption of data according to a first encryption mode and a total memory encryption engine (TME) to handle encryption/decryption of the data according to a second encryption mode. The TME and the MEE may include, in part, a shared pipeline that handles a majority of encryption and decryption of the data that is, respectively, written to and read from memory. The MEU may further include logic to direct selection of encrypted or decrypted data from the TME and the MEE responsive to a region of memory to which a physical address of a memory request is directed, which is described in detail with reference to FIG. 3 and Table 1.

In one example, the first and second encryption modes are two different advanced encryption standard (AES) modes, although the present disclosure may apply to different encryption standards, and AES is chosen for ease of explanation and widespread usage. Advanced encryption standard (AES) is a block cipher standard in which the encryption or decryption is executed on a fixed-length group of bits called a block. A mode of operation refers to how to repeatedly apply a cipher's single-block operation to securely transform amounts of data larger than a block. There are several different AES modes of encryption, two of which are AES-Counter Mode (or AES-CTR) and AES-XES Tweakable Block Cipher with Cipher-text Stealing (AES-XTS), to which will be referred only by way of example. Additional security may be provided through a message authentication code (MAC) and/or a digital signature to ensure integrity of data in addition to encryption.

The present assignee provides a number of trusted execution environments (TEE) (or solutions) such as software guard extension (SGX), SGX-encryption-only (SGX-EO) and/or Total Memory Encryption (TME). The SGX-TEE uses memory encryption engine (MEE) hardware, which employs an AES-CTR mode encryption engine along with MEE metadata including a hash tree with a MAC, version (VER) data and level counters for encryption, integrity protection and replay protection of data. The SGX-EO provides a user a choice related to performance and security levels that can modify the security properties in order minimize impacts on bandwidth and performance. In SGX-EO mode, the code that controls the instruction set architecture (ISA) may be under full protected range, but application level code and data may use EO range. For full protection range, the MEE hardware may be used to provide encryption, integrity protection and replay protection. For application level code and data, a data line may be encrypted when it is sent out of a processor chip or device to memory. The EO range may also use the AES-XTS mode of encryption. TME may also use the AES-XTS mode of encryption.

As discussed, these various memory protection solutions include trade-offs of strength of security properties for different performance, storage and bandwidth overheads. Accordingly, a need exists to enable this range of security solutions across different products to address various market segments which may have different security and performance requirements. While such a range of security solutions may be desired, CPU die area is constrained and very expensive. Performance degradation at the cost of added security is also a significant concern in the purchase decision of products employing these various memory protection solutions. The present disclosure addresses these concerns with a hardware solution for enabling a range of memory protection security solutions to suite various market segments while minimizing area overheads on-die and improving performance.

FIG. 1 is a block diagram of a processing device 100 according to one embodiment that interfaces with main memory 102 within a computing device. The processing device 100 may include one or more processor cores 110, core cache 115 on die with the core(s) 110, a processor bus 120 or the like, and a memory execution unit (MEU) 130 to control memory writes to and reads from main memory 102.

The MEU 130 may also include a memory execution engine (MEE) 140, a total memory encryption (TME) engine 150 (or just TME 150), cache 160 and a controller 170. The MEU 130 may allocate memory requests based on a physical address space 104 within the main memory. The processor bus 120 may be any kind of connection between the processor core(s) 110 and the MEU 130, and thus need not be a formal computer bus.

The MEE and TME engines 140 and 150 may be combined to include a shared encryption pipeline as will be discussed with reference to FIGS. 4, 5A, 5B and 5C, thus significantly reducing the on-die area used for encryption by as much as 40%. The controller 170 may control the way data corresponding to memory requests are encrypted through the MEE and/or TME engines as will be discussed in more detail with reference to FIG. 3, in order to handle various security solutions with differing levels of encryption.

Figure 2:
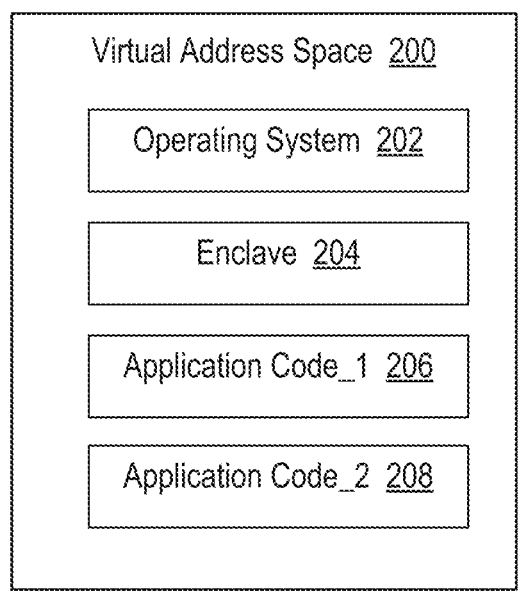
FIG. 2 is a block diagram of an enclave created within virtual address space for an application.

FIG. 2 is a block diagram of an enclave 204 created within a virtual address space 200 for an application. The virtual address space 200 may also include code and data for an operating system 202 and application codes 206 and 208 that may write data into and read data out of the enclave 204.

The SGX-TEE allows the protected portion of an application to be distributed in the clear. Before the enclave 204 is built, enclave code and data are free for inspection and analysis. The protected portion is loaded into the enclave where its code and data are measured. Once the application's protected portion of the code and data are loaded into an enclave, it is protected against external software access. An enclave may prove its identity to a remote party and provide the necessary building-blocks for secure provisioning of keys and credentials. The application may also request an enclave-specific and platform-specific key that it can use to protect keys and data that it wishes to store outside the enclave.

The SGX-TEE introduces two significant capabilities to the ISA. First is the change in enclave memory access semantics. The second is protection of the address mappings of the application. Enclave memory management is divided into two parts: address space allocation and memory commitment.

Address space allocation is the specification of the range of logical addresses that the enclave may use. This range is called the ELRANGE. No actual resources are committed to this region. Memory commitment is the assignment of actual memory resources (as pages) within the allocated address space. This two-phase technique allows flexibility for enclaves to control their memory usage and adjust dynamically without overusing memory resources when enclave needs are low. Commitment adds physical pages to the enclave. An operating system may support separate allocate and commit operations.

Proper memory management procedure for enclave memory access or non-enclave memory access is expected throughout the life cycle of an enclave: from creation, use, to destruction. During enclave creation, code and data for an enclave are loaded from a clear-text source, i.e. from non-enclave memory.

Un-trusted application code may start using an initialized enclave by using an SGX EENTER instruction to transfer control to the enclave code residing in protected enclave page cache (EPC). The enclave code may return to the caller via the EEXIT instruction. Upon enclave entry, control may be transferred by hardware to software inside the enclave. The software inside the enclave may switch the stack pointer to one inside the enclave. When returning back from the enclave, the software swaps the stack pointer then executes the EEXIT instruction.

On processors that support SGX2 extensions, an enclave writer may add memory to an enclave using an SGX2 instruction set, after the enclave is built and running. These instructions allow adding additional memory resources to the enclave for use in such areas as the heap. In addition, SGX2 instructions allow the enclave to add new threads to the enclave. The SGX2 features provide additional capabilities to the software model without changing the security properties of the SGX architecture.

An active enclave consumes available resources from the EPC. The SGX-TEE provides the EREMOVE instruction that an EPC manager can use to reclaim resources committed to an enclave no longer in use. The EPC manager uses EREMOVE on every page. After execution of EREMOVE the page is available for allocation to another enclave.

The SGX-TEE solution uses MEE hardware and provides confidentiality, integrity and replay protection that protects the memory subsystem from physical injection attack, memory aliasing attack, software attack, cold-boot attack, and replay attack. But, SGX-TEE has a significant performance impact. Therefore, in one embodiment, an SGX-EO (or similar) protection may employ full protection using MEE for memory storing code which controls ISA, but uses EO protection for memory under SGX enclave used by application level code and data using the SGX ISA. This SGX-EO mode provides a good enough security solution without degrading performance. For example, the SGX-EO security solution provides confidentiality of data on reset attacks and protection from many software attacks via SGX ISA protection.

To protect from memory aliasing attack and memory confidentiality, TME is another TEE solution that uses the AES-XTS cryptographic hardware engine for encryption of the data line moving out of a processor chip for an entire system memory outside the SGX enclave 204.

The present disclosure describes a modular hardware solution to enable the mentioned ranges of TEE security solutions using a unified cryptographic (or encryption) engine shared by both the MEE for an encryption/decryption hardware engine as well as by the TME blocks for an encryption/decryption hardware engine following AES-XTS encryption standard for TME and AES-CTR encryption standard for MEE. Other encryption standards and modes are envisioned in addition to or in lieu of those discussed.

Figure 3:
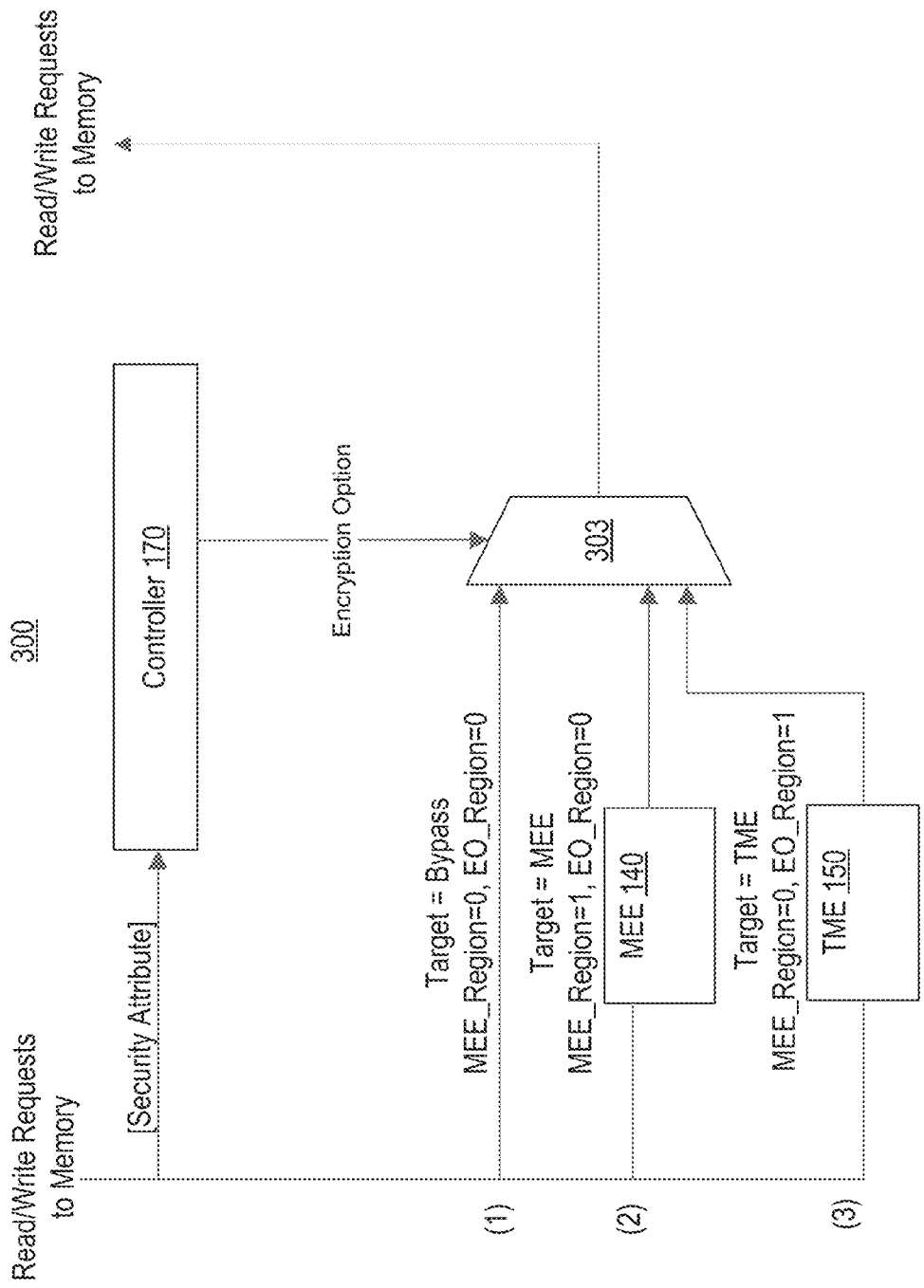
FIG. 3 is a block diagram of a system for directing memory requests according to chosen security attributes targeted by the memory requests.

FIG. 3 is a block diagram of a system 300 for directing memory requests according to chosen security option and memory region targeted by the memory requests. In one embodiment, the controller 170 may keep track of an enabled security solution (such as SGX, SGX-EO or TME) at boot or reset time. The controller 170 may also implement an address range check to enable security options based on an address targeted within memory by a physical address of a read or write memory request. The controller 170 may include a number of registers to direct the encryption of data by the MEE 140 and the TME 150 by sending an encryption option to a multiplexer 303.

The controller 170 may, depending on the enabled security solution and the address range targeted by the memory request, direct the multiplexer 303 to select one of at least three encryption options: 1) no encryption or security; 2) encryption with the MEE 140 hardware; and 3) encryption with TME 150 hardware.

In one embodiment, the processing device 100 and/or the MEU 130 may assign a security attribute to memory requests when received. In another embodiment, the controller 170 may instead assign the security attribute. For each memory request, the security attribute may be assigned based on a level of protection afforded to a region of memory targeted by a physical address of the memory request. Once assigned, the security attribute may also be appended to the memory request to travel with the memory request to the controller (e.g., when the controller does not determine the security attribute as well).

More specifically, for memory requests that require confidentiality, integrity, and replay-protection, the processing device (or MEU or controller) may map the memory requests to the region protected by the MEE 140 and set the security attribute bit for a MEE_region security attribute. The controller 170 may receive the MEE_region=1 security attribute bit with the memory request and select cipher text from data that has been processed by the MEE 140, as will be explained in more detail with reference to FIGS. 4, 5A, 5B and 5C.

With continued reference to FIG. 3, for memory requests with only confidentiality requirements (e.g., a "good enough" security), the processing device (or MEU or controller) may map these memory requests to the region protected by the TME 150 and set the security attribute bit for the EO_region security attribute. The controller 170 may receive the EO_region=1 security attribute bit with the memory request and select cipher text that has been processed by the TME 150, as will be explained in more detail with reference to FIGS. 4, 5A, 5B and 5C.

For requests that do not have any security requirements, the processing device (or MEU or controller) may set the MEE_region and EO_region security attributes to zero, allowing the controller to bypass the request without sending the request to either the MEE or the TME engine.

Table 1 below includes the different security (or encryption) solutions to which the processing device 100 may direct read and write requests to memory in different ways depending on the security attribute (which, as discussed, is based on the address range of the memory request that comes into the system 300). More than one of these security solutions may be made available to a customer or vendor to choose from before the component or device housing the MEU 130 is placed into service.

TABLE 1

| Option | Address Range of Memory Request | Target Destination ID |
|---|---|---|
| 1 | MEE_Region = 0 EO_Region = 0 | Bypass |

TABLE 1-continued

| Option | Address Range of Memory Request | Target Destination ID |
|---|---|---|
| 2 | MEE_Region = 0<br>EO_Region = 1 | TME |
| 3 | MEE_Region = 1<br>EO_Region = 0 | MEE |

The first column of Table 1 is the security solution (or option) number. The second column indicates the security attribute received with a memory read or write request related to one of the security modes discussed herein (e.g., SGX, SGX-EO, TME). For requests with a high security attribute, MEE_region=1, for requests with a good enough security attribute, MEE_region=0, EO_region=1, and for rest of the requests, MEE_region=0 and EO_region=0. The target destination identification (ID), or third, column explains which encryption hardware block, if any, may be used for each security solution.

Option 1: No address ranges may reside in the EO or MEE regions. The request may be directly sent to memory, bypassing the MEE 140 and the TME 150.

Option 2: The memory request may be directly sent to the TME 150. The EO region may be protected by the EO mode and the address ranges may not be used by SGX ISA. No address ranges may reside in the MEE region.

Option 3: The request may be directly sent to the MEE 150. The MEE region may be protected by encryption, integrity and replay protection. The address ranges of the MEE region may be used by the SGX ISA. No address ranges may reside in the TME region.

Thus, depending on address checks and configurations, requests to memory may use selected security solutions either from the MEE 140 or the TME 150, or from neither. MEE hardware may provide AES-CTR encryption of data lines along with integrity and replay protection with MEE metadata. For EO range of memory regions, the TME hardware block may provide AES-XTS-based encryption of data lines to memory. One cannot use counter mode encryption of MEE hardware without providing integrity of the counters. So, to avoid performance overhead, one should not use integrity and replay protection with MEE metadata, hence a different mode of encryption (TME) may be used for encryption-only range, as discussed above.

Figure 4:
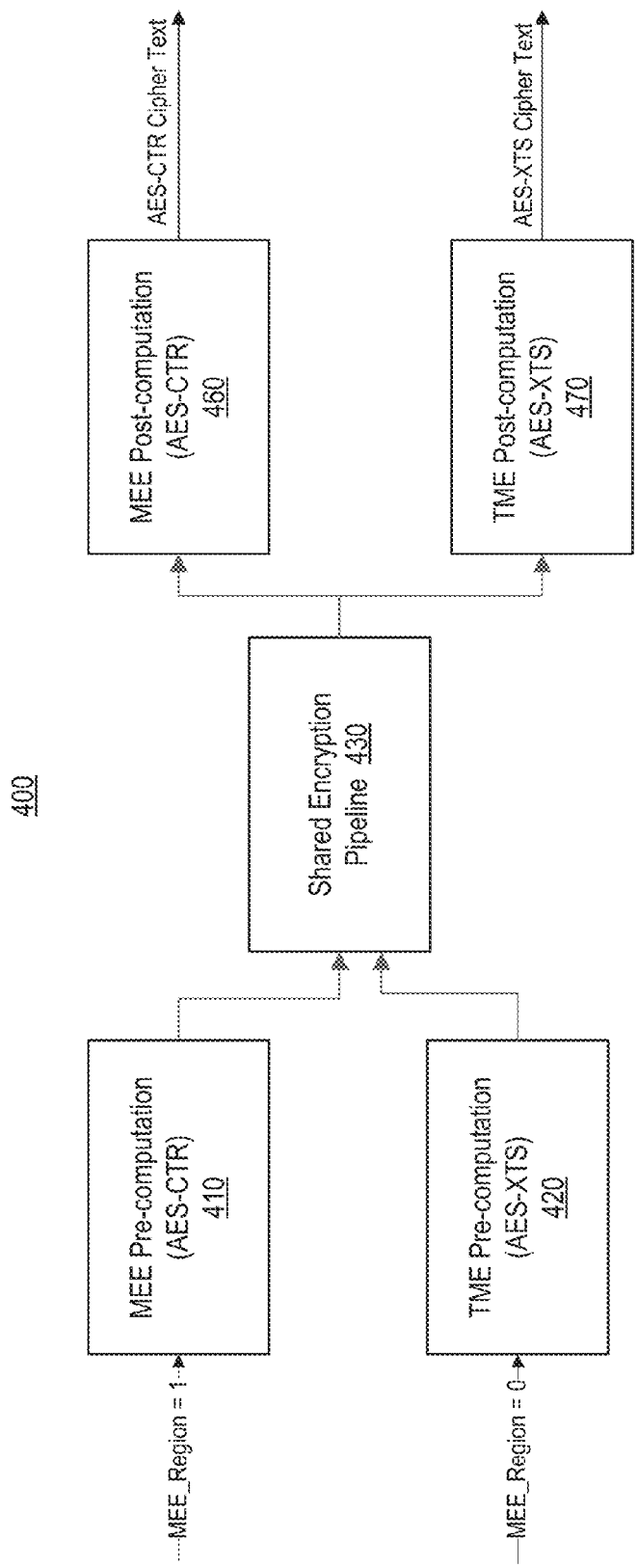
FIG. 4 is a high-level block diagram of an encryption/decryption engine pipeline employing multiple encryption modes using a shared encryption pipeline.

FIG. 4 is a high-level block diagram of an encryption/decryption engine pipeline 400 employing multiple encryption modes. When a data line is sent out of a processor chip (or the like) to memory, the plain text within the data line may be encrypted with a unique key into cipher text. When a data line is read out of memory into the processor chip (or the like), the cipher text within the data line may be decrypted with the same unique key used to encrypt the plain text during encryption.

In one embodiment, the encryption/decryption engine pipeline 400 includes an MEE pre-computation block 410 that uses AES-CTR encryption for MEE regions and a TME pre-computation block 420 that uses AES-XTS encryption for other regions. Additional encryption modes may be used in addition to AES-CTR and AES-XTS for additional, varying memory regions, but only two encryption modes are explained here for ease of explanation.

The encryption/decryption engine pipeline 400 may further include a shared encryption pipeline 430 that receives the outputs of both the MEE pre-computation block 410 and the TME pre-computation block 420. The encryption/decryption engine pipeline 400 may further include an MEE post-computation block 460 for generating AES-CTR cipher text from data input into the MEE pre-computation block 410, and to provide integrity and replay protection. The encryption/decryption engine pipeline 400 may further include a TME post-computation block 470 for generating AES-XTS cipher text from the data input into the TME pre-computation block 420.

In this way, address information, counters and plain text data coming into the encryption/decryption engine pipeline 400 may be encrypted differently, and treated at different security levels, without having two separate cryptographic pipelines by sharing the shared encryption pipeline 430. In one embodiment, the shared encryption pipeline 430 handles 80% of the encryption while the pre and post computation blocks handle the other 20%, thus significantly reducing on-die space needed for the encryption/decryption engine pipeline 400.

Figure 5A:
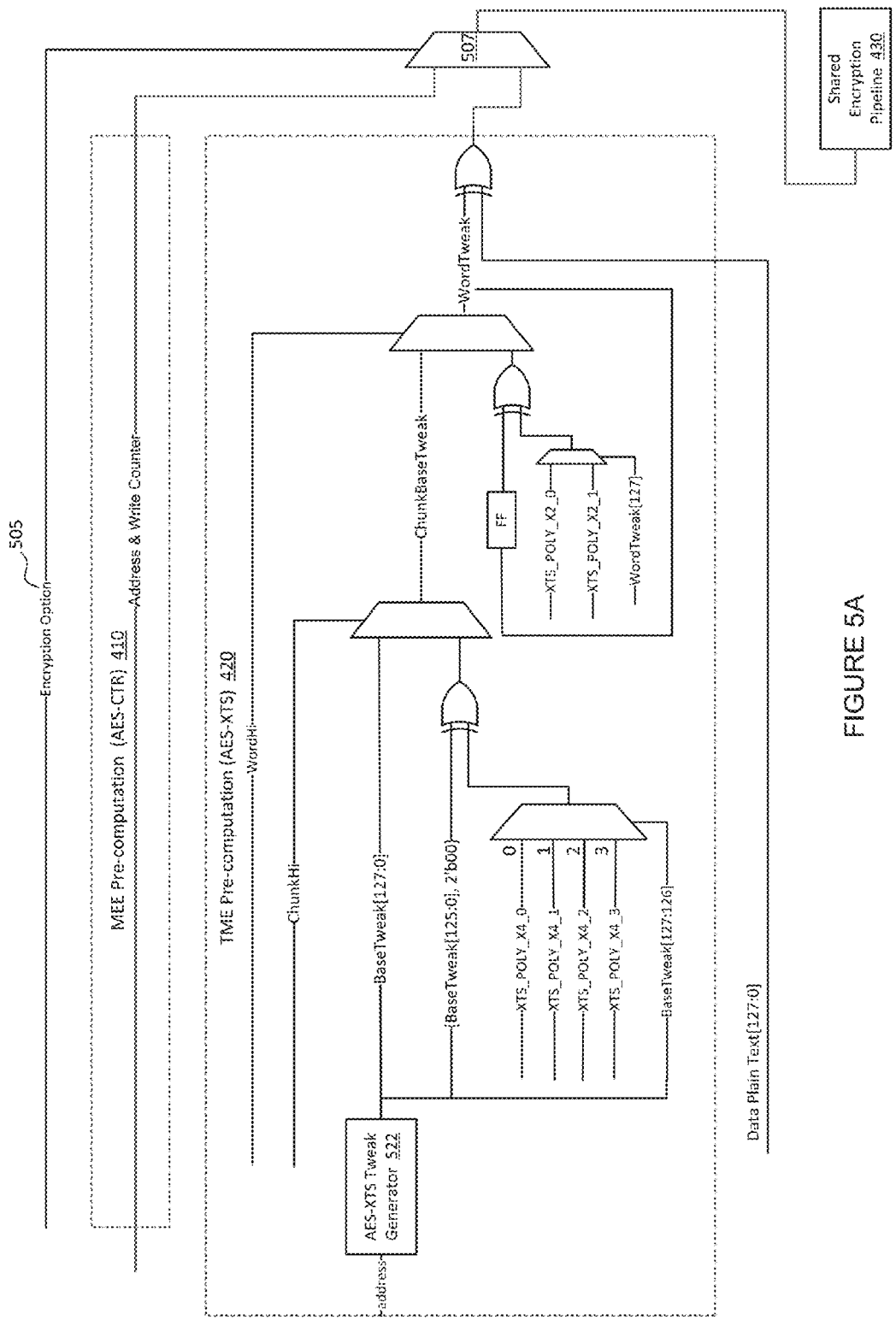
FIG. 5A is a detailed block diagram of the pre-computation blocks of the encryption/decryption engine pipeline of FIG. 4.

FIG. 5A is a detailed block diagram of the pre-computation blocks of the system of FIG. 4, e.g., the MEE pre-computation block 410 and the TME pre-computation block 420. An encryption option 505 determined based on the memory region and controllable by the controller 170 may control a multiplexer 507 to choose between an output from either the MEE pre-computation block 410 or the TME pre-computation block 420 to send to the shared encryption pipeline 430.

The MEE pre-computation block 420 may use a unique seed associated with each data line to be written to memory. The seed may be generated out of physical address of the memory request and a write counter, e.g., a version number which is unique per data line and per write request to that data line. This seed may be generated even when the data line associated with the memory request is not available yet in the encryption/decryption engine pipeline 400. As the seed is generated using the physical address and unique counter (which is incremented for each write) of the memory request, the seed provides both spatial and temporal uniqueness. The unique seed may be passed through the encryption/decryption engine pipeline 400 to generate a unique value called the pad. The may be used to encrypt/decrypt the data line. The cipher text may be generated by XORing the pad with the data line within the MEE post-computation block 460 (FIG. 5C). Accordingly, the encryption/decryption operations for counter mode operation can be summarized as follows:

CryptoPad=$AES_k$(Seed)
Encryption=Plain Text XOR CryptoPad
Decryption=Cipher Text XOR CryptoPad This AES-CTR may be replaced by any counter-mode encryption within the scope of the present disclosure. The output of the MEE pre-computation block 410 to the shared encryption pipeline 430, when chosen, may include: 1) a clock; 2) a key as programmed; and 3) data_in (e.g., 128 bit)={x'b0, 40-45 bits address bits, 56 bits of version counters}.

The AES-XTS encryption within the TME pre-computation block 420 may include an AES-XTS tweak generator 522 that computes a base tweak. The base tweak may be derived from the physical address of the memory request and be associated with a 64 byte cryptographic segment. The base tweak provides spatial uniqueness so that the same plain text going to different locations in system memory may encrypt to unique cipher text values.

The TME pre-computation block 420 may use the base tweak to produce a chunk base tweak (which is half the size or 32 bytes), which is turn may be used to produce a word tweak (which is half the size of the chunk tweak, or 16 bytes). The word tweak may then be XOR'd, for example, with the 128 bits of the data line before being sent to the shared encryption pipeline 430. In summary, the output of the TME pre-computation block 420 sent to the shared encryption pipeline 430, when chosen, includes: 1) a clock; 2) a key as programmed; and 3) data_in (of 128 bits)=XOR (16B word tweak, 128 bit data of the request data line).

Figure 5B:
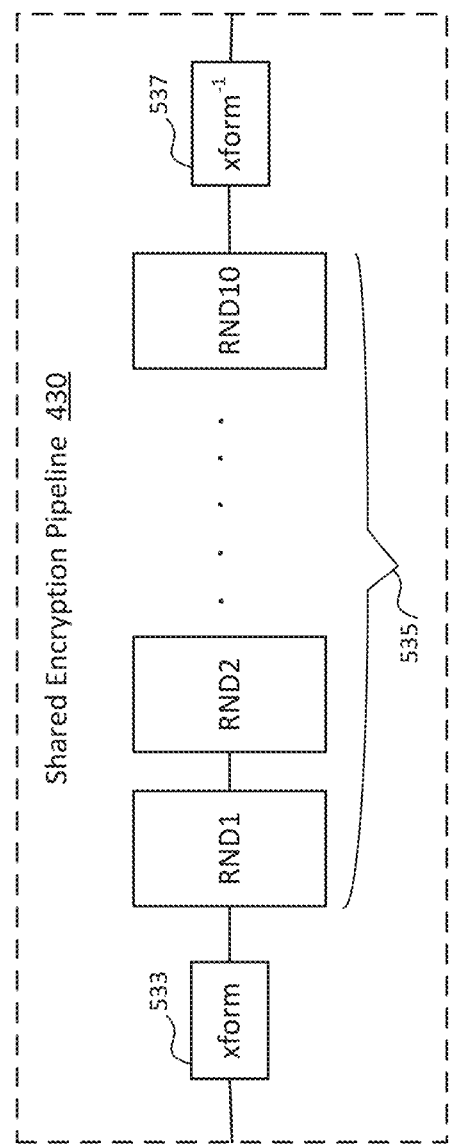
FIG. 5B is a detailed block diagram of the shared encryption pipeline of the encryption/decryption engine pipeline of FIG. 4.
Figure 5C:
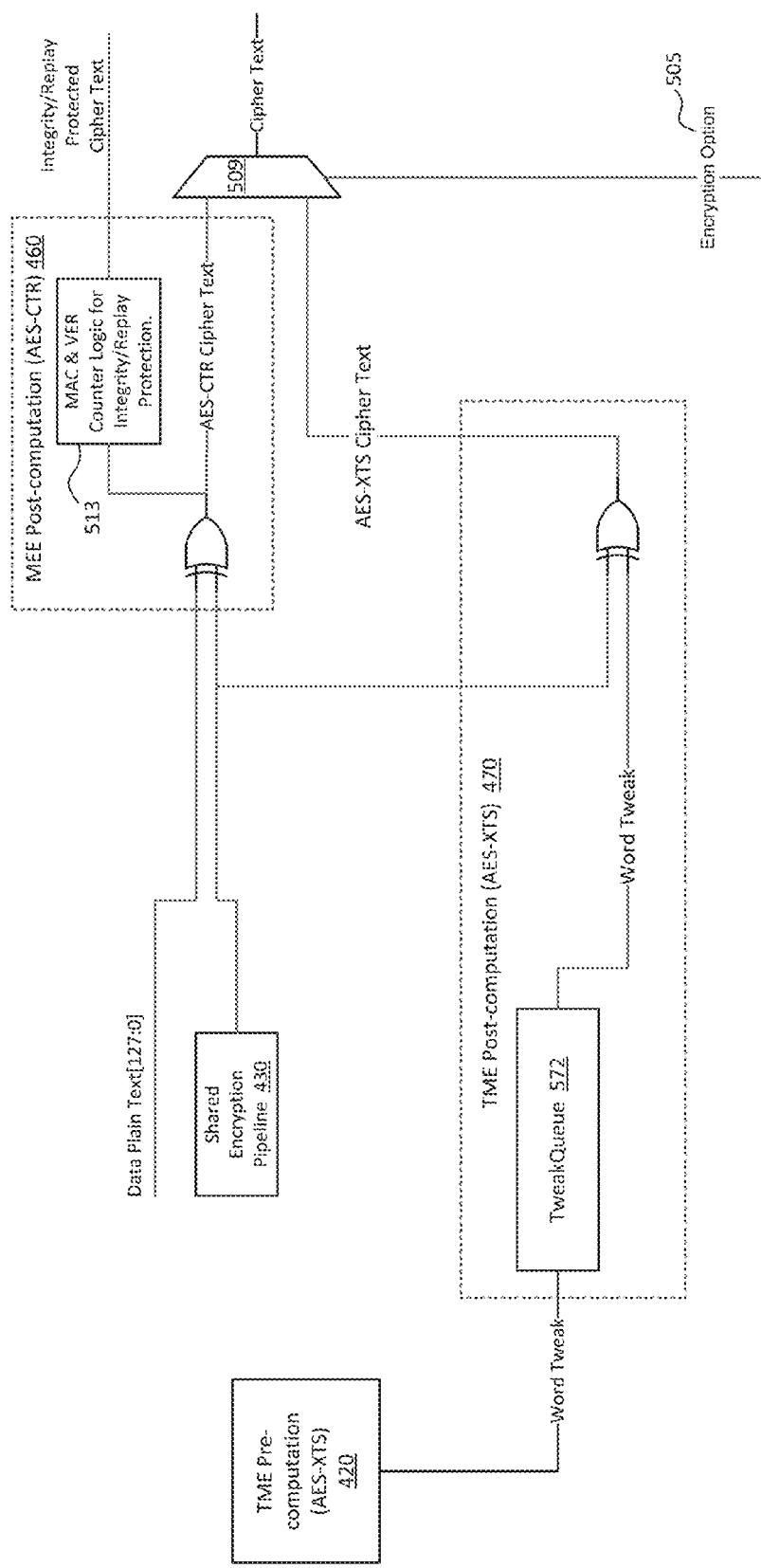
FIG. 5C is a detailed block diagram of the post-computation blocks of the encryption/decryption engine pipeline of FIG. 4.

FIG. 5B is a detailed block diagram of the shared encryption pipeline 430 of the encryption/decryption engine pipeline of FIG. 4. The shared encryption pipeline 430 may include a transformation block 533, a number of rounds (RINDS) 535 of AES encryption (in this case showing 10 rounds), and a reverse transformation block 537 complementary to the transformation block 533. The shared encryption pipeline 430 may include the AES pipeline hardware used at the core of the AES encryption/decryption algorithms, thus making up approximately 80% of the encryption and decryption hardware of the encryption/decryption engine pipeline 400.

Based on the current architecture, it is guaranteed to get more requests to the TME 150 than to the MEE 140, so the shared encryption pipeline 430 has been adapted with a weighted round-robin arbitration logic where, for every 10 arbitration slots, one arbitration slot is given to MEE when 9 arbitration slots are given to TME when there are valid memory requests from both the MEE and TME pipelines. Additional or different algorithms may also be employed, including a different allocation between MEE and TME of arbitration slots.

FIG. 5C is a detailed block diagram of the post-computation blocks of the system of FIG. 4, e.g., the MEE post-computation block 460 and the TME post-computation block 470. The encryption option 505, controllable by the controller 170, may control a multiplexer 509 to choose between an output from either the MEE post-computation block 460 or the TME post-computation block 470.

The MEE post-computation block 560 may XOR the 128-bit data line output by the shared encryption pipeline with the 128-bit plain text data line. A MAC and VER block 513 may further apply a message authentication code and version (VER) counter logic to add integrity protection and replay protection of the cipher text data, which may also be output.

The TME post-computation block 470 may XOR the 128-bit data line output by the shared encryption pipeline with the 16 byte word tweak generated by the TME pre-computation block 420. The TME post-computation block 470 may include a tweak queue 572 to hold the word tweak for the corresponding output once released from the shared encryption pipeline 430, to ensure proper timing of the XOR function.

FIG. 6A is a block diagram illustrating a micro-architecture for a processor core 600 that may execute the processing device 100 and/or the memory execution unit (MEU) 130 of FIG. 1. Specifically, processor core 600 depicts an in-order architecture core and a register renaming logic, out-of-order issue/execution logic to be included in a processor according to at least one embodiment of the disclosure. The embodiments of the error correcting code that carry additional bits may be implemented by processor core 600.

The processor core 600 includes a front end unit 630 coupled to an execution engine unit 650, and both are coupled to a memory unit 670. The processor core 600 may include a reduced instruction set computing (RISC) core, a complex instruction set computing (CISC) core, a very long instruction word (VLIW) core, or a hybrid or alternative core type. As yet another option, processor core 600 may include a special-purpose core, such as, for example, a network or communication core, compression engine, graphics core, or the like. In one embodiment, processor core 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the primary instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 may be coupled to the physical register file unit(s) 658. Each of the physical register file unit(s) 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 may be overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 may be coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor core 600 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor core 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 690 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
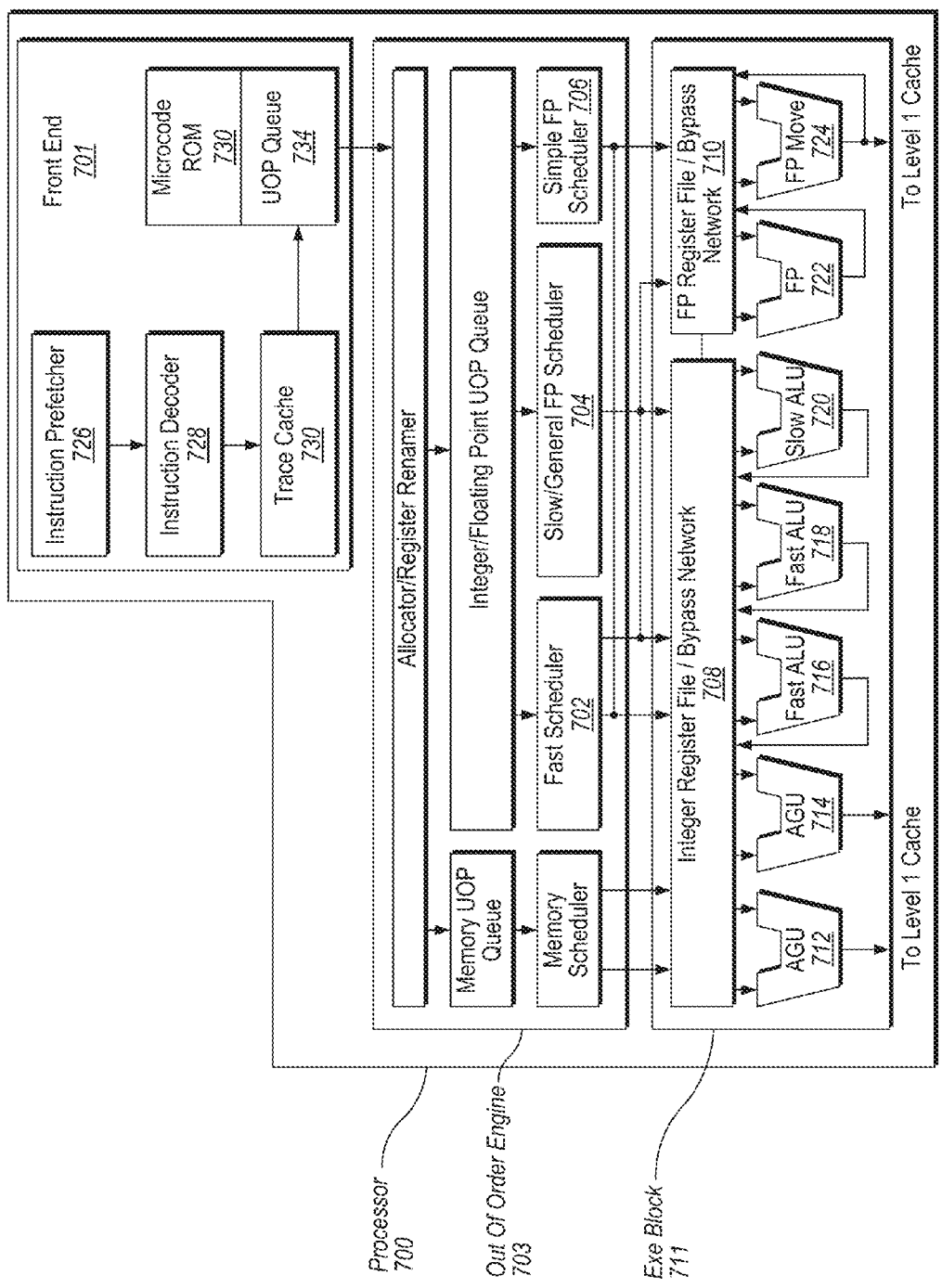
FIG. 7 illustrates a block diagram of the micro-architecture for a processor that includes logic circuits to execute a processing device and/or memory execution unit as illustrated in FIG. 1, according to one embodiment.

FIG. 7 illustrates a block diagram of the micro-architecture for a processor 700 that includes logic circuits that may execute the processing device 100 and/or the memory execution unit (MEU) 130 of FIG. 1. In some embodiments, an instruction in accordance with one embodiment may be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The embodiments that may execute the controller 170 and/or the cores 110 of FIG. 1 may be implemented by processor 700.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM (or RAM) 732 may provide the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction may be decoded into a small number of micro ops for processing at the instruction decoder 718. In another embodiment, an instruction may be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment may schedule on each half of the main clock cycle while the other schedulers may only schedule once per main processor clock cycle. The schedulers arbitrate for the dispatch ports to schedule uops for execution.

Register files 708, 710, sit between the schedulers 702, 704, 706, and the execution units 712, 714, 716, 718, 720,722, 724 in the execution block 711. There is a separate register file 708, 710, for integer and floating point operations, respectively. Each register file 708, 710, of one embodiment also includes a bypass network that may bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 714. For one embodiment, the floating point execution blocks 722, 724, execute floating point, MMX, SIMD, and SSE, or other operations. The floating point ALU 722 of one embodiment includes a 64-bit-by-64-bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment may execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, may be implemented to support a variety of data bits including 16, 32, 128, 256, etc. Similarly, the floating point units 722, 724, may be implemented to support a range of operands having bits of various widths. For one embodiment, the floating point units 722, 724, may operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128 bits wide XMM registers relating to SSE2, SSE3, SSE4, or beyond (referred to generically as "SSEx") technology may also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
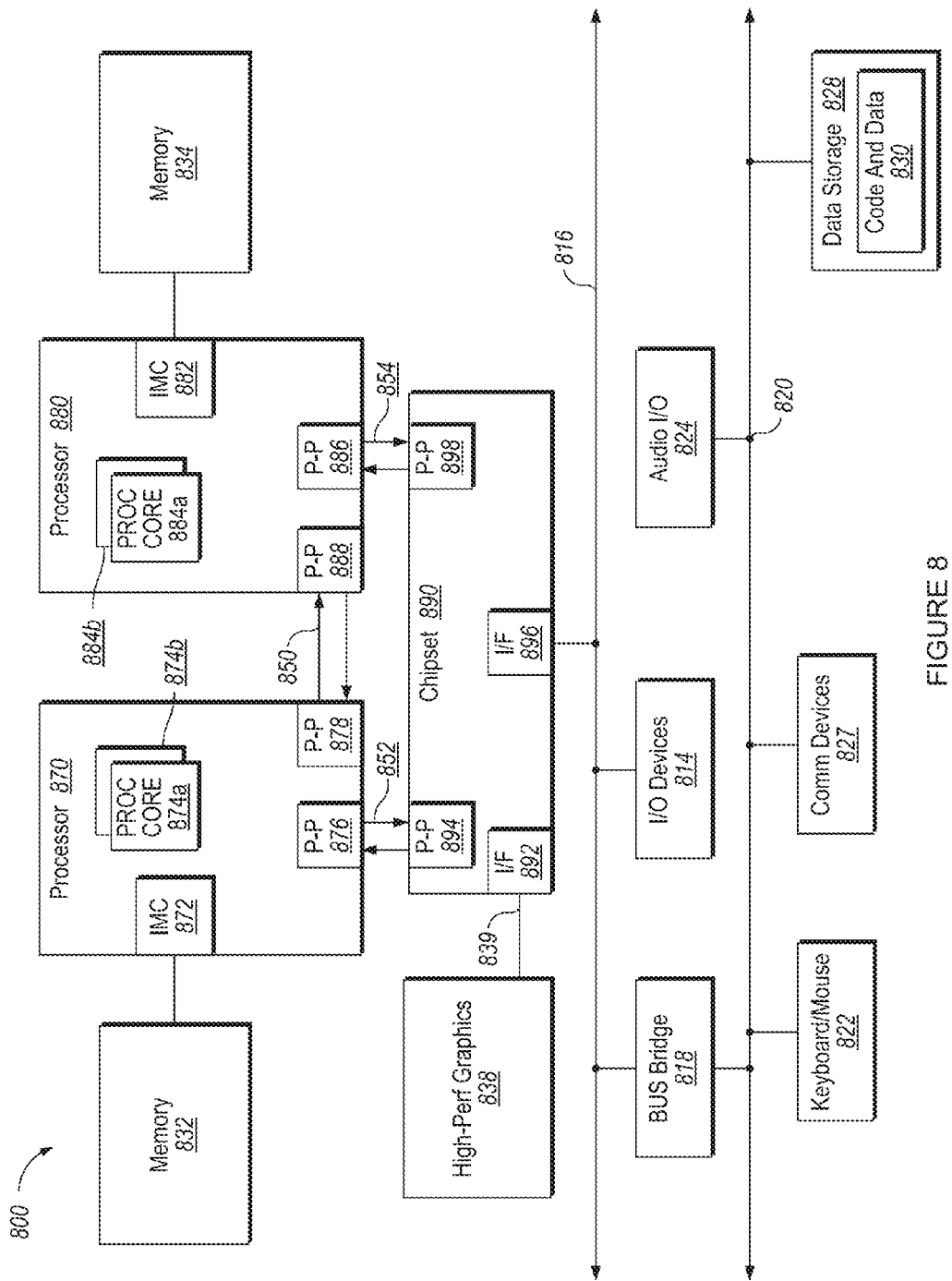
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874*a* and 874*b* and processor cores 884*a* and 884*b*), although potentially many more cores may be present in the processors. The processors each may include hybrid write mode logics in accordance with an embodiment of the present. The embodiments that may execute the processing device 100 and/or the memory execution unit (MEU) 130 of FIG. 1 may be implemented in the processor 870, the processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 872 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 11, a system may implement a multi-drop bus or other such architecture.

Figure 9:
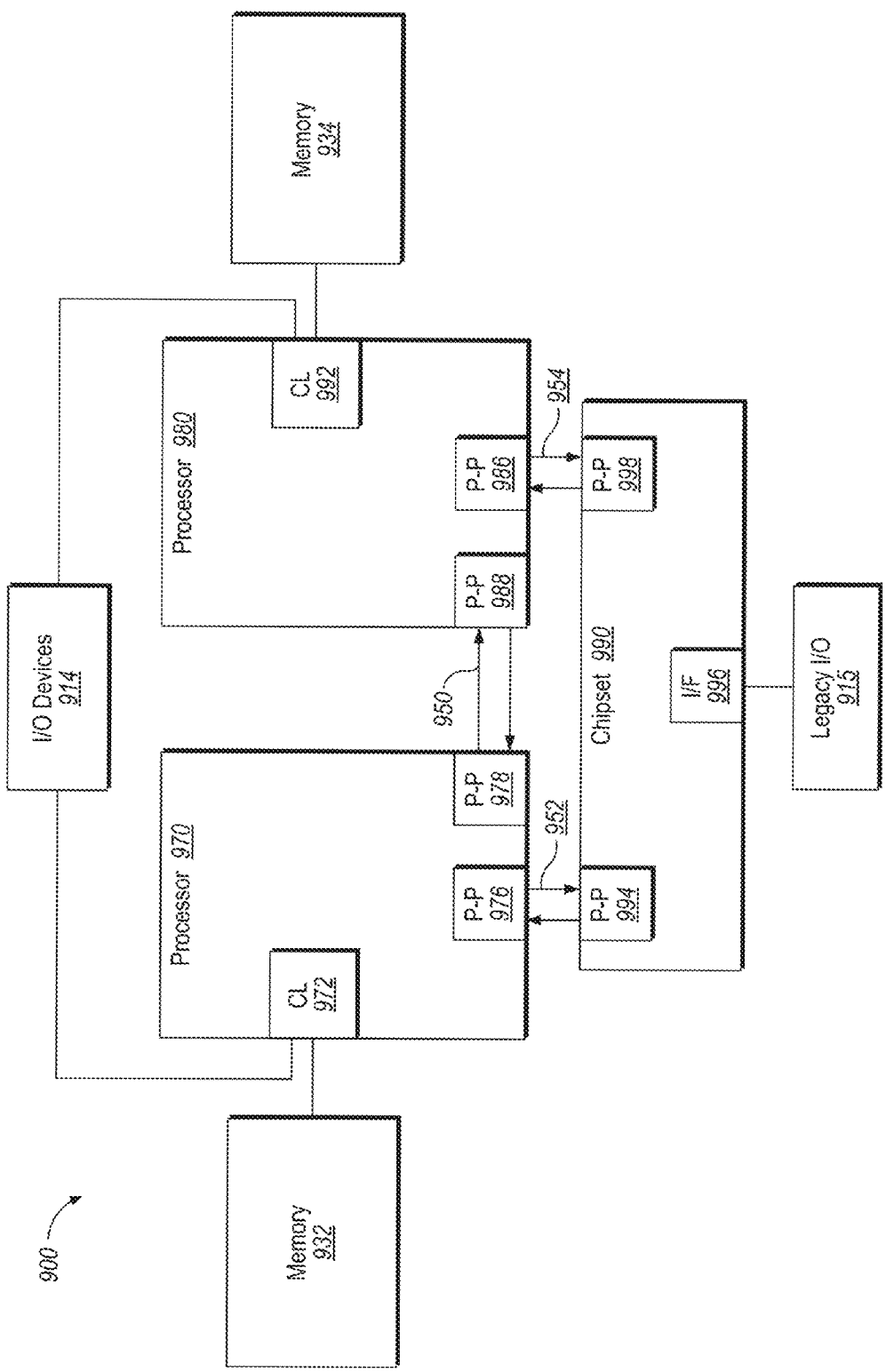
FIG. 9 is a block diagram of a computer system according to another implementation.

Referring now to FIG. 9, shown is a block diagram of a third system 900 in accordance with an embodiment of the present disclosure. Like elements in FIGS. 9 and 10 bear like reference numerals, and certain aspects of FIG. 9 have been omitted from FIG. 10 in order to avoid obscuring other aspects of FIG. 9.

FIG. 9 illustrates that the processors 970, 980 may include integrated memory and I/O control logic ("CL") 972 and 992, respectively. For at least one embodiment, the CL 972, 982 may include integrated memory controller units such as described herein. In addition, CL 972, 992 may also include I/O control logic. FIG. 9 illustrates that the memories 932, 934 are coupled to the CL 972, 992, respectively, and that I/O devices 914 are also coupled to the control logic 972, 992. Legacy I/O devices 915 are coupled to the chipset 990. The embodiments that may execute the processing device 100 and/or the memory execution unit (MEU) 130 of FIG. 1 may be implemented in processor 970, in processor 980, or in both processors 970 and 980.

Figure 10:
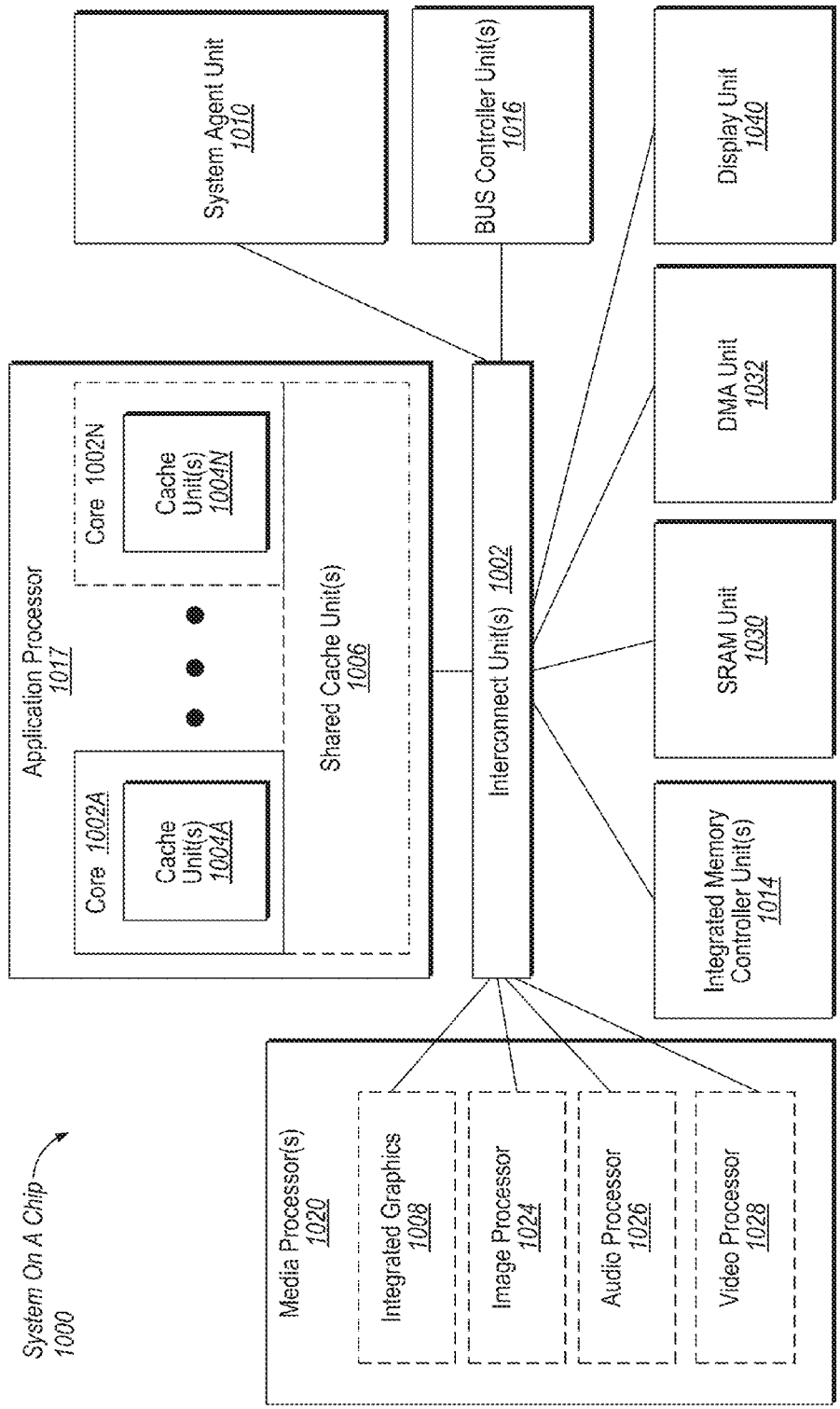
FIG. 10 is a block diagram of a system-on-a-chip according to one implementation.

FIG. 10 is an exemplary system on a chip (SoC) 1000 that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1000 of FIG. 10, dashed lined boxes are features on more advanced SoCs. An interconnect unit(s) 1002 may be coupled to: an application processor 1017 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Figure 11:
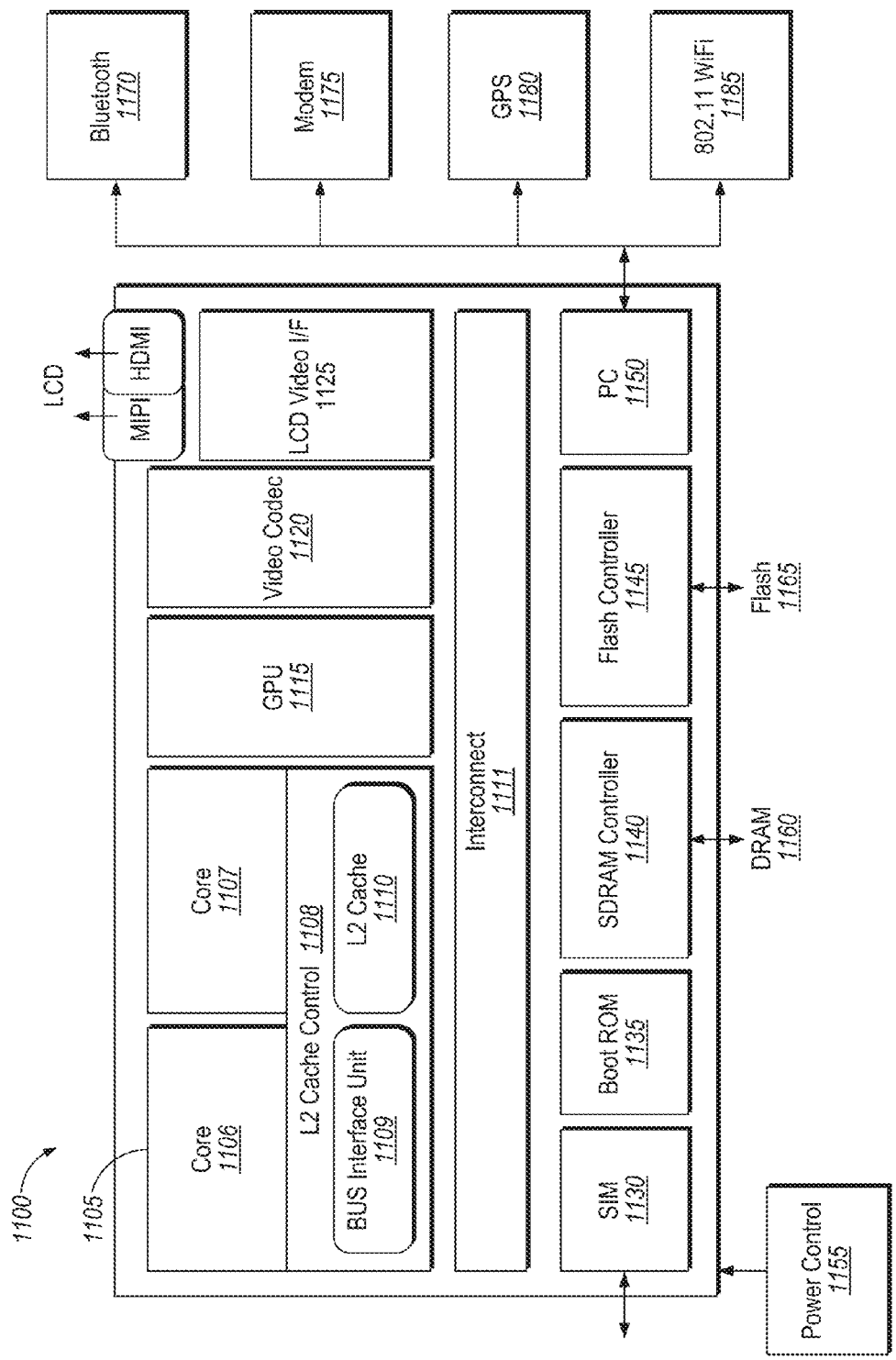
FIG. 11 illustrates another implementation of a block diagram for a computing system.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which may correspond in nature to a mobile station (MS) in a GSM network. The embodiments that may execute the controller 170 and/or the cores 110 of FIG. 1 may be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which may implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
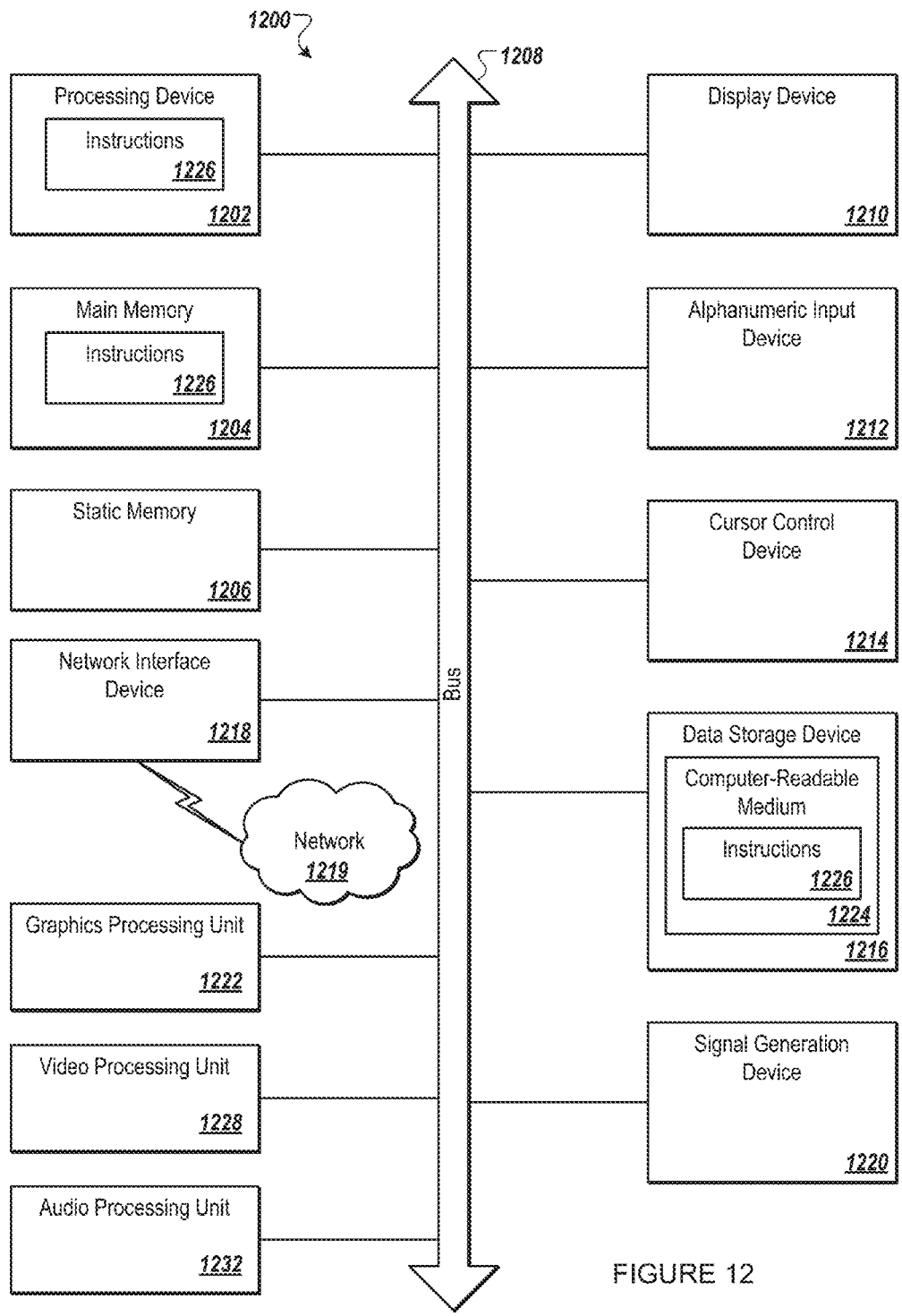
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments that execute the processing device 100 and/or the memory execution unit (MEU) 130 of FIG. 1 may be implemented in computing system 1200.

The computing system 1200 includes a processing device 1202, main memory 1204 (e.g., flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1208.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processor cores. The processing device 1202 is configured to execute the processing logic 1226 for performing the operations discussed herein.

In one embodiment, processing device 1202 may be the processing device 100 of FIG. 1. Alternatively, the computing system 1200 may include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1218 communicably coupled to a network 1219. The computing system 1200 also may include a video display device 1210 (e.g., a liquid crystal display (LCD) or a cathode ray tube (CRT)), an alphanumeric input device 1210 (e.g., a keyboard), a cursor control device 1214 (e.g., a mouse), a signal generation device 1220 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1216 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIGS. 1-3, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processing device including: 1) a first encryption pipeline to encrypt and decrypt data with a first encryption mode; 2) a second encryption pipeline to encrypt and decrypt data with a second encryption mode; and 3) wherein the first encryption pipeline and the second encryption pipeline share a single, shared pipeline for a majority of encryption and decryption operations performed by the first encryption pipeline and by the second encryption pipeline.

In Example 2, the processing device of Example 1, wherein the first encryption mode and the second encryption mode are two different advanced encryption standard (AES) modes, and the shared pipeline comprises an AES cryptographic pipeline.

In Example 3, the processing device of Examples 1-2, wherein the first encryption mode comprises AES-Counter Mode Encryption (AES-CTR) and the second encryption mode comprises AES-XES Tweakable Block Cipher with Cipher-text Stealing (AES-XTS).

In Example 4, the processing device of Examples 1-3, further including 1) a controller having a plurality of registers to: a) identify, from a memory request, a security attribute corresponding to a security level calling for a certain level of encryption; and b) select encrypted or decrypted data from the first and second encryption pipelines according to one of a plurality of encryption options responsive to the security attribute.

In Example 5, the processing device of Example 4, wherein the plurality of encryption options comprises: not encrypting the data; encrypting the data with the first encryption mode; and encrypting the data with the second encryption mode.

In Example 6, the processing device of Example 4, wherein the certain level of encryption comprises one of: no encryption; encryption by a memory encryption engine (MEE); or encryption by a total memory encryption engine (TME).

In Example 7, the processing device of Example 4, wherein the controller is further to generate the security attribute according to a region of memory targeted by the memory request, wherein the region of memory is selected from an MEE region, an encryption-only (EO) region, and a region outside of a protected region of memory.

Various embodiments may have different combinations of the structural features described above. For instance, all optional features of the computing system described above may also be implemented with respect to the method or process described herein and specifics in the examples may be used anywhere in one or more embodiments.

Example 8 is a hardware pipeline including: 1) first and second pre-computation blocks containing logic to begin encryption of data according to, respectively, a first encryption mode and a second encryption mode before being moved to memory; 2) a shared encryption pipeline coupled to the first and second pre-computation blocks and to perform a majority of a remainder of the encryption of the data regardless of encryption mode; and 3) first and second post-computation blocks coupled to the shared encryption pipeline and containing logic to complete encryption of the data according to, respectively, a corresponding one of the first encryption mode and the second encryption mode before the data is written to the memory.

In Example 9, the hardware pipeline of Example 8, wherein the first encryption mode and the second encryption mode are two different advanced encryption standard (AES) modes, and the shared encryption pipeline comprises an AES encryption pipeline that applies a plurality of rounds of AES encryption.

In Example 10, the hardware pipeline of Examples 8-9, wherein the first encryption mode comprises AES-Counter Mode Encryption (AES-CTR) and the second encryption mode comprises AES-XES Tweakable Block Cipher with Cipher-text Stealing (AES-XTS).

In Example 11, the hardware pipeline of Examples 8-10, wherein an output of the first pre-computation block comprises a combination of a physical address of a memory request and a write counter.

In Example 12, the hardware pipeline of Examples 8-10, wherein an output of the second pre-computation block comprises an XOR of a word tweak of a physical address of a memory request and a plurality of plain text bits of the data corresponding to the physical address.

In Example 13, the hardware pipeline of Examples 8-10, wherein the second pre-computation block comprises a tweak generator and logic to generate a word tweak, and wherein the second post-computation block comprises a tweak queue in which to delay the word tweak until encrypted data corresponding to the word tweak exits the shared encryption pipeline.

In Example 14, the hardware pipeline of Example 8, further including 1) a controller to control encryption of the data, the controller to: a) identify, from a memory request, a security attribute calling for a level of encryption according to a region of memory targeted by a physical address of the memory request; and b) select encrypted or decrypted data from the first and second post-computation blocks according to one of a plurality of encryption options responsive to the security attribute.

In Example 15, the hardware pipeline of Example 14, wherein the plurality of encryption options comprises: not encrypting the data; encrypting the data with the first encryption mode; and encrypting the data with the second encryption mode.

In Example 16, the hardware pipeline of Example 14, wherein the level of encryption comprises one of: no encryption; encryption by a memory encryption engine (MEE); or encryption by a total memory encryption engine (TME).

Various embodiments may have different combinations of the structural features described above. For instance, all optional features of the processors and methods described above may also be implemented with respect to a system described herein and specifics in the examples may be used anywhere in one or more embodiments.

Example 17 is a memory execution unit (MEU) including: 1) a memory encryption engine (MEE) to handle encryption and decryption of data according to a first encryption mode; 2) a total memory encryption engine (TME) to handle encryption and decryption of the data according to a second encryption mode; 3) wherein the TME and the MEE include, in part, a shared pipeline that handles a majority of encryption and decryption of the data that is, respectively, written to and read from memory; and 4) logic to direct selection of encrypted or decrypted data from the TME and the MEE responsive to a region of memory to which a physical address of a memory request is directed.

In Example 18, the MEU of Example 17, wherein the first encryption mode and the second encryption mode are two different advanced encryption standard (AES) modes, and the shared pipeline comprises an AES cryptographic pipeline.

In Example 19, the MEU of Examples 17-18, wherein the first encryption mode comprises AES-Counter Mode Encryption (AES-CTR) and the second encryption mode comprises AES-XES Tweakable Block Cipher with Cipher-text Stealing (AES-XTS).

In Example 20, the MEU of Examples 17-19, wherein the logic is to: a) determine whether the physical address of the memory request targets an MEE_region of the memory, an EO region of the memory, or no protected region of memory; b) append a security attribute to the memory request according to the region of memory targeted; and c) select the encrypted or decrypted data from the TME and the MEE according to at least one of a plurality of encryption options responsive to the security attribute.

In Example 21, the MEU of Example 20, wherein the plurality of encryption options comprises: bypassing the TME and the MEE; encrypting the data with the first encryption mode; and encrypting the data with the second encryption mode.

In Example 22, the MEU of Example 20, wherein the security attribute corresponds to a security solution selected from: software guard extension (SGX); SGX-encryption-only (SGX-EO); and a total memory encryption (TME).

In Example 23, the MEU of Example 20, wherein the region of memory comprises one or both of a memory encryption engine (MEE) region and an encryption-only (EO) region.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to employing error correcting code to carry additional bits in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processing device comprising:
    a first hardware encryption pipeline to encrypt and decrypt data with a first encryption mode;
    a second hardware encryption pipeline to encrypt and decrypt data with a second encryption mode, wherein the first hardware encryption pipeline and the second hardware encryption pipeline share a single, shared hardware pipeline for a majority of encryption and decryption operations performed by the first hardware encryption pipeline and by the second hardware encryption pipeline; and
    a controller coupled to the first hardware encryption pipeline and to the second hardware encryption pipeline, the controller to:
        identify, from a memory request, a region of memory targeted by the memory request, wherein the region of memory is one of: a first region that includes encryption, integrity, and replay protection; a second region that is for encryption only; or a third region that is outside of the first and second regions, wherein the first region of memory comprises a first physical address and the second region of memory comprises a second physical address different than the first physical address;
        select encrypted or decrypted data output from the first hardware encryption pipeline in response to identification that the memory request targets the first region of the memory; and
        select encrypted or decrypted data output from the second hardware encryption pipeline in response to identification that the memory request targets the second region of the memory.

2. The processing device of claim 1, wherein the first encryption mode and the second encryption mode are two different advanced encryption standard (AES) modes, and the shared hardware pipeline comprises an AES cryptographic pipeline.

3. The processing device of claim 2, wherein the first encryption mode comprises AES-Counter Mode Encryption (AES-CTR) and the second encryption mode comprises AES-XES Tweakable Block Cipher with Cipher-text Stealing (AES-XTS).

4. The processing device of claim 1, wherein the controller comprises a plurality of registers to:
identify, from the memory request, a security attribute corresponding to a security level that calls for a certain level of encryption; and
one of bypass the first and second hardware encryption pipelines or select the encrypted or decrypted data from the first and second encryption pipelines, according to one of a plurality of encryption options corresponding to the security attribute.

5. The processing device of claim 4, wherein the plurality of encryption options comprises: not encrypting the data via the bypass of the first and second hardware encryption pipelines; encrypting the data with the first encryption mode; and encrypting the data with the second encryption mode.

6. The processing device of claim 4, wherein the certain level of encryption comprises one of: encryption by a memory encryption engine (MEE); encryption by a total memory encryption engine (TME); or no encryption via bypassing the MEE and the TME.

7. A processing device comprising:
a first hardware encryption pipeline to encrypt and decrypt data with a first encryption mode;
a second hardware encryption pipeline to encrypt and decrypt data with a second encryption mode, wherein the first hardware encryption pipeline and the second hardware encryption pipeline share a single, shared hardware pipeline for a majority of encryption and decryption operations performed by the first hardware encryption pipeline and by the second hardware encryption pipeline; and
a controller comprising a plurality of registers to:
identify, from a memory request, a security attribute corresponding to a security level that calls for a certain level of encryption according to a region of memory targeted by the memory request, wherein the region of memory is one of a memory encryption engine (MEE) region or an encryption-only (EO) region, and wherein the MEE region comprises a first physical address and the EO region comprises a second physical address different than the first physical address; and
select the encrypted or decrypted data from the first and second encryption pipelines according to one of a plurality of encryption options corresponding to the security attribute.

8. A hardware pipeline comprising:
first and second pre-computation blocks containing logic to begin encryption of data according to, respectively, a first encryption mode and a second encryption mode before being moved to memory;
a shared encryption pipeline coupled to the first and second pre-computation blocks and to perform a majority of a remainder of the encryption of the data regardless of encryption mode;
first and second post-computation blocks coupled to the shared encryption pipeline and containing logic to complete encryption of the data according to, respectively, a corresponding one of the first encryption mode and the second encryption mode before the data is written to the memory; and
a controller coupled to first and second pre-computation blocks and to the first and second post-computation blocks, wherein the controller is to:
identify, from a memory request, a security attribute that calls for a level of encryption according to a region of the memory targeted by a physical address of the memory request; and
select encrypted data from one of the first or second post-computation blocks in response to the security attribute being associated with a protected region of the memory.

9. The hardware pipeline of claim 8, wherein the first encryption mode and the second encryption mode are two different advanced encryption standard (AES) modes, and the shared encryption pipeline comprises an AES encryption pipeline that applies a plurality of rounds of AES encryption.

10. The hardware pipeline of claim 9, wherein the first encryption mode comprises AES-Counter Mode Encryption (AES-CTR) and the second encryption mode comprises AES-XES Tweakable Block Cipher with Cipher-text Stealing (AES-XTS).

11. The hardware pipeline of claim 8, wherein an output of the first pre-computation block comprises a combination of the physical address of the memory request and a write counter.

12. The hardware pipeline of claim 8, wherein an output of the second pre-computation block comprises an XOR of a word tweak of the physical address of the memory request and a plurality of plain text bits of the data corresponding to the physical address.

13. The hardware pipeline of claim 8, wherein the second pre-computation block comprises a tweak generator and logic to generate a word tweak, and wherein the second post-computation block comprises a tweak queue in which to delay the word tweak until encrypted data corresponding to the word tweak exits the shared encryption pipeline.

14. The hardware pipeline of claim 8, wherein the controller is to select the encrypted data from the first and second post-computation blocks according to one of a plurality of encryption options corresponding to the security attribute.

15. The hardware pipeline of claim 14, wherein the plurality of encryption options comprises: not encrypting the data via a bypass of the first and second pre-computation blocks; encrypting the data with the first encryption mode; and encrypting the data with the second encryption mode.

16. The hardware pipeline of claim 8, wherein the level of encryption comprises one of: no encryption via a bypass of the first and second pre-computation blocks; encryption by a memory encryption engine (MEE); or encryption by a total memory encryption engine (TME).

17. A memory execution unit (MEU) comprising:
a memory encryption engine (MEE) to handle encryption and decryption of data according to a first encryption mode;
a total memory encryption engine (TME) to handle encryption and decryption of the data according to a second encryption mode;
wherein the TME and the MEE include, in part, a shared hardware pipeline that handles a majority of encryption and decryption of the data that is, respectively, written to and read from memory; and
logic to direct selection of one of unencrypted data from the memory or encrypted or decrypted data from the TME and the MEE, wherein the selection corresponds to a region of memory to which a physical address of a memory request is directed.

18. The MEU of claim 17, wherein the first encryption mode and the second encryption mode are two different advanced encryption standard (AES) modes, and the shared hardware pipeline comprises an AES cryptographic pipeline.

19. The MEU of claim 18, wherein the first encryption mode comprises AES-Counter Mode Encryption (AES-CTR) and the second encryption mode comprises AES-XES Tweakable Block Cipher with Cipher-text Stealing (AES-XTS).

20. The MEU of claim 17, wherein the logic is to:
determine whether the physical address of the memory request targets an MEE region of the memory corresponding to the first encryption mode, an EO region of the memory corresponding to the second encryption mode, or no protected region of memory corresponding to the unencrypted data;
append a security attribute to the memory request according to the region of memory that is targeted; and
select one of the unencrypted data from the memory or the encrypted or decrypted data from the TME and the MEE, according to one of a plurality of encryption options corresponding to the security attribute.

21. The MEU of claim 20, wherein the plurality of encryption options comprises: bypassing the TME and the MEE; encrypting the data with the first encryption mode; and encrypting the data with the second encryption mode.

22. The MEU of claim 20, wherein the security attribute corresponds to a security solution selected from: software guard extension (SGX); SGX-encryption-only (SGX-EO); and a total memory encryption (TME).

23. The MEU of claim 17, wherein the region of memory comprises one or both of a memory encryption engine (MEE) region and an encryption-only (EO) region.

* * * * *